United States Patent [19]

Ueda et al.

[11] 4,453,506

[45] Jun. 12, 1984

[54] AUTOMATIC ENGINE STOP AND START SYSTEM

[75] Inventors: Masahiro Ueda; Masahiko Noba; Osamu Hori; Kimitoshi Murata; Hatsuo Nakao, all of Toyota, Japan

[73] Assignee: Toyota Jidosha Kogyo Kabushiki Kaisha, Aichi, Japan

[21] Appl. No.: 371,970

[22] Filed: Apr. 26, 1982

[30] Foreign Application Priority Data

Jul. 22, 1981 [JP] Japan .................................. 56-114574

[51] Int. Cl.³ .............................................. F02D 17/00
[52] U.S. Cl. ............................. 123/179 G; 123/179 B; 123/179 BG; 123/198 DB; 123/198 DC
[58] Field of Search ................. 123/198 DB, 198 DC, 123/179 B, 179 BG, 179 A, 179 G; 180/54 R; 307/10 R

[56] References Cited

U.S. PATENT DOCUMENTS

| | | | |
|---|---|---|---|
| 3,872,316 | 3/1975 | Kurii et al. ....................... | 123/179 B |
| 4,192,279 | 3/1980 | Maisch et al. ................... | 123/179 A |
| 4,286,683 | 9/1981 | Zeigner et al. .................. | 123/179 B |
| 4,312,310 | 1/1982 | Chivilo' et al. ............... | 123/198 DB |

*Primary Examiner*—Andrew M. Dolinar
*Attorney, Agent, or Firm*—Oblon, Fisher, Spivak, McClelland & Maier

[57] ABSTRACT

In a system wherein the operating conditions of various portions of a vehicle are detected and an engine is automatically stopped and started in accordance with the operating conditions thus detected, a fuel supply system is cut to prevent the run-on of the engine in addition to the cut-off of current passage to an ignition system as in the prior art. There controls are effected when both any one or more of predetermined operating conditions and any one or more of conditions of precluding the automatic stop are present.

8 Claims, 2 Drawing Figures

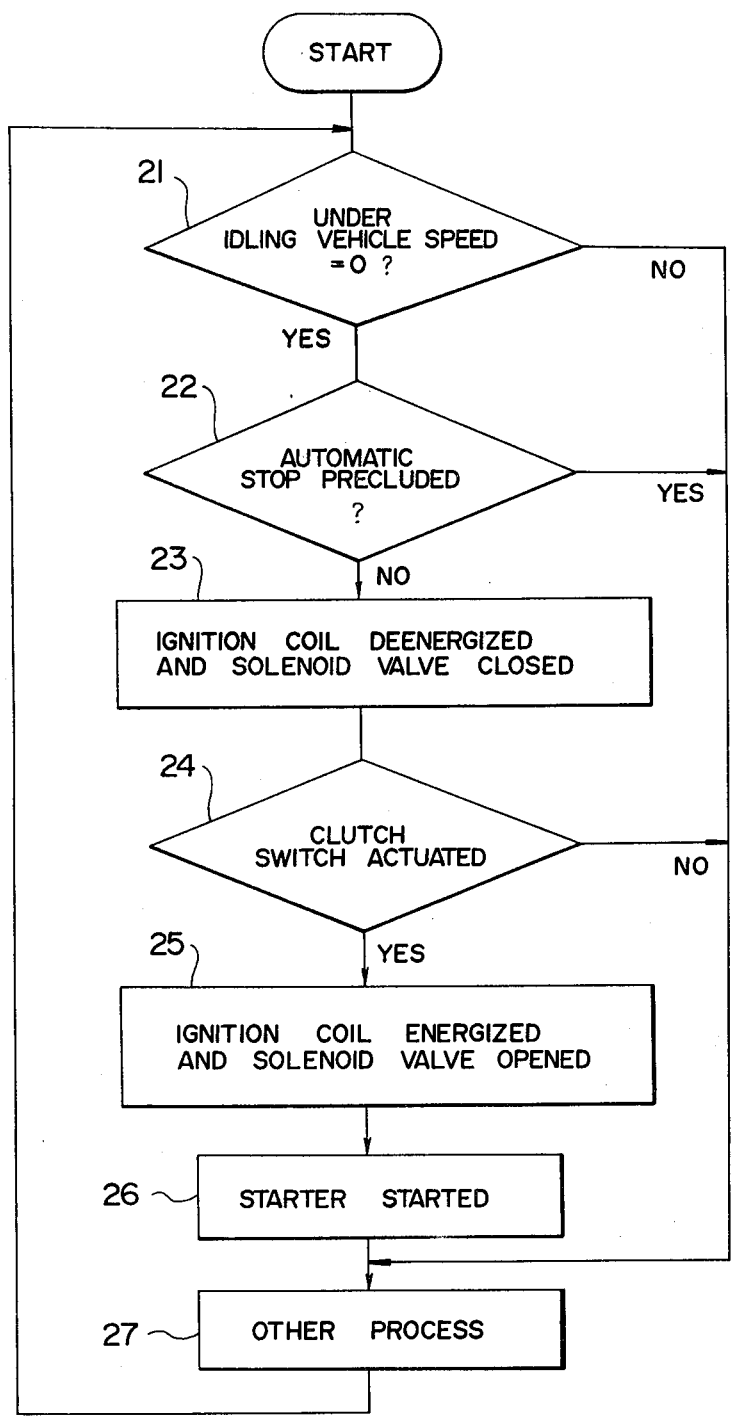

AUTOMATIC ENGINE STOP AND START SYSTEM

BACKGROUND OF THE INVENTION

1. Field of the Invention

This invention relates to an automatic engine stop and start system for automatically stopping and starting an engine in accordance with the operating conditions.

2. Description of the Prior Art

Some of the motor cars are equipped with automatic engine stop and start systems capable of automatically stopping the engine when the motor car stops at a crossroads or the like during running through a town and of starting the engine by an ordinary departing operation (depressing of a clutch pedal, for example) at the time of restarting the engine. Equipping the motor cars with such systems as described above makes it possible to reduce the exhaust gases in volume and the consumption of fuel, as the engines are operated when deemed necessary.

Heretofore, in the system of the type described, to stop the engine in operation, the passage of current to an ignitor has been cut off. However, even if the passage of current to ignition plugs is cut off, a fuel supply system is not cut off, whereby there has been a possibility of the run-on of the engine. Additionally, due to this run-on, the fuel in a slow port is completely consumed, thereby presenting a disadvantage of deteriorated restart characteristics of the engine.

SUMMARY OF THE INVENTION

The present invention has as its object the provision of an automatic engine stop and start system wherein the run-on of an engine is prevented and the restart characteristics is improved.

The present invention contemplates that the passage of current to ignition plugs is cut off, and simultaneously, the fuel supply is cut off, so that the fuel in a slow port can avoid being fed into combustion chambers of an engine.

BRIEF DESCRIPTION OF THE DRAWINGS

FIG. 2 is a flow chart showing an example of the process according to the present invention.

DETAILED DESCRIPTION OF THE INVENTION

Figure 1:
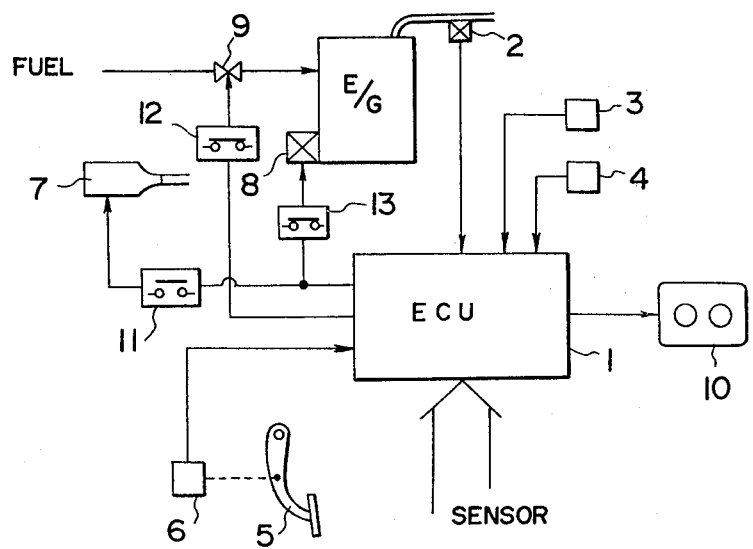
FIG. 1 is a block diagram showing an embodiment of the present invention.

The embodiment of the present invention shown in FIG. 1 comprises an electronic control unit as being the core, sensors and the like connected to this electronic control unit for feeding various data, and components to be controlled.

The core of the system is an electronic control unit 1 (hereinafter referred to as "ECU"). When a microcomputer is used as ECU for example, ECU is commonly used for versatile purposes such as air-fuel ratio control, running data indication control and the like in addition to the automatic stop and start which is studied in the present invention. The sensors required for the automatic stop and start include: a water temperature switch 2 for detecting the temperature of cooling water; a rotation detector 3 for detecting rotation of the engine; a vehicle speed detector 4 for detecting whether the vehicle speed is zero or not; a clutch switch 6 for detecting the depression of a clutch pedal 5; and the like.

More specifically, if both the vehicle speed and the rotation of the engine are zero, the automatic start can be effected by the depression of the clutch pedal 5. If the vehicle speed is zero (provided that other conditions of preclusion do not take place), the engine can be automatically stopped. Besides, when the vehicle speed is very low, the vehicle is stopped at a slope, the vehicle is stopped with a left turn signal being issued, the temperature of the engine cooling water is low or high, the power consumption is high with the head lamps, etc. being turned on, or the like, there is present a situation where the safety may be hindered, and hence, the automatic stop is precluded. As the data for the preclusion, there are taken in signals from an accelerator pedal, not shown, turn signal switches, a banking sensor, lighting switches (for the head lamps, etc.), a cooler switch and the like in addition to the aforesaid water temperature switch 2. ECU 1 performs control of current passage to ignition plugs 7, control of start (driving) of a starter 8, control of a fuel valve (solenoid valve) 9 and control of an indication panel 10 for indicating the system being set and the stopped state of the engine. In addition, the operation of the engine automatic stop can be stopped by cutting off the power supply to ECU 1.

The cut of current passage to the ignition coils 7 is effected by control of a relay 11 by ECU 1. The fuel cut is effected such that a solenoid valve 9 is provided in the intermediate portion of a fuel supply system for feeding fuel to a slow port and the current passage to this solenoid valve 9 is cut off by a relay 12. Description will hereunder be given of controls of the ignition plugs 7 and the solenoid valve 9 with reference to the accompanying drawing.

FIG. 2 is an example of the flow chart of the process by ECU 1.

When the vehicle speed detector 4 detects that the vehicle speed is zero and the rotation of the engine is detected to be idling in Step 21, determination as to whether any one of the automatic stop conditions is present or not is made in Step 22. If some of the automatic stop condition is or are present, then, in Step 23, in order to stop the engine, the relay 11 is turned "OFF" to cut off the current passage to the ignition plugs 7, and the relay 12 is turned "OFF" to cut off the current passage to the solenoid valve 9 to close the same, whereby the engine is stopped without having the run-on. The process of restart is effected by Steps 24, 25 and 26. More specifically, when the clutch pedal 5 is fully depressed, the clutch switch 6 is actuated, whereby the relays 11 and 12 are actuated to feed current to the ignition coils 7 and the solenoid valve 9, respectively, and a relay 13 is actuated to start the starter 8, thus enabling to automatically start the engine.

Upon completion of the process of the automatic stop and start, Step 27 follows where the air-fuel ratio control, the running data indication control and the like are performed.

By the process shown in FIG. 2, both the ignition cut and the fuel cut are simultaneously performed, so that the run-on can be prevented to improve the start characteristics. In consequence, the drive feeling can be improved and also the period of time required for the engine stop can be shortened.

It should be apparent to one skilled in the art that the abovedescribed embodiments are merely illustrative of but a few of many possible specific embodiments of the present invention. Numerous and varied other arrangements can be readily devised by those skilled in the art without departing from the spirit and scope of the invention.

What is claimed is:

1. An automatic engine stop and start system for an internal combustion engine having a slow port to which fuel is fed when the internal combustion engine is in an idling condition and an ignition circuit including an ignition plug and an ignition coil producing high voltage to be fed to said ignition plug, wherein predetermined operating conditions of various predetermined portions of a vehicle are detected and the internal combustion engine is automatically stopped and started in accordance with the detected operating conditions, comprising:
    a fuel control valve for cutting fuel fed to said slow port when the internal combustion engine is automatically stopped; and
    de-energizing means connected to said fuel control valve and said ignition coil for cutting off current fed to said ignition coil and simultaneously closing said fuel control valve when the predetermined conditions for automatic engine stopping are fulfilled.

2. An automatic engine stop and start system according to claim 1, wherein said fuel control valve comprises:
    a solenoid valve.

3. An automatic engine stop and start system according to claim 1, wherein said de-energizing means comprises:
    a first relay switch interposed between said fuel control valve and a power source, and
    a second relay switch interposed between said ignition coil and the power source,
    wherein when said predetermined conditions for automatic engine stopping are fulfilled, said first and second relay switches are opened, respectively, thereby cutting the currents fed to said fuel control valve and said ignition coil.

4. An automatic engine stop and start system according to claim 2, wherein said de-energizing means comprises:
    a first relay switch interposed between said fuel control valve and a power source, and
    a second relay switch interposed between said ignition coil and the power source,
    wherein when said predetermined conditions for automatic engine stopping are fulfilled, said first and second relay switches are opened, respectively, thereby cutting the currents fed to said fuel control valve and said ignition coil.

5. An automatic engine stop and start system according to claim 1, comprising:
    means for opening said fuel control valve when said predetermined conditions for automatic engine stopping are fulfilled,
    whereby fuel is fed to the combustion engine through said slow port when the internal combustion engine is automatically started.

6. An automatic engine stop and start system according to claim 2, comprising:
    means for opening said fuel control valve when said predetermined conditions for automatic engine stopping are fulfilled,
    whereby fuel is fed to the combustion engine through said slow port when the internal combustion engine is automatically started.

7. An automatic engine stop and start system according to claim 3, comprising:
    means for opening said fuel control valve when said predetermined conditions for automatic engine stopping are fulfilled,
    whereby fuel is fed to the combustion engine through said slow port when the internal combustion engine is automatically started.

8. An automatic engine stop and start system according to claim 4, comprising:
    means for opening said fuel control valve when said predetermined conditions for automatic stopping are fulfilled,
    whereby fuel is fed to the combustion engine through said slow port when the internal combustion engine is automatically started.

* * * * *